United States Patent [19]

Schedel

[11] Patent Number: 4,539,167

[45] Date of Patent: Sep. 3, 1985

[54] METHOD OF MOLDING AN ELONGATE FOAMED RESIN ARTICLE FROM EXPANDABLE THERMOPLASTIC RESIN BEADS

[76] Inventor: Wolfgang E. Schedel, 136 Terrace Rd., Sebenza, Edenvale, Johannesburg, Transvaal, South Africa

[21] Appl. No.: 482,161

[22] Filed: Apr. 5, 1983

[51] Int. Cl.³ .............................................. B29D 27/00
[52] U.S. Cl. ...................................... 264/51; 264/323; 425/4 R; 425/4 C
[58] Field of Search ................... 264/51, 53, 321, 323; 425/4 C, 4 R

[56] References Cited

U.S. PATENT DOCUMENTS

| | | | |
|---|---|---|---|
| 3,042,973 | 7/1962 | Brockhues | 264/51 |
| 3,058,162 | 10/1962 | Grabowski | 264/53 |
| 3,086,248 | 4/1963 | Culp | 264/53 |
| 3,224,039 | 12/1965 | Kracht | 264/53 X |
| 3,239,880 | 3/1966 | Oxel | 264/51 X |
| 3,345,442 | 10/1967 | Oxel | 264/51 |
| 3,452,390 | 7/1969 | Borcovec | 264/53 X |
| 3,537,131 | 11/1970 | Kracht et al. | 264/53 X |
| 3,832,429 | 8/1974 | Charpentier | 264/51 |
| 3,871,801 | 3/1975 | Buchmann | 264/51 X |

FOREIGN PATENT DOCUMENTS

| | | | |
|---|---|---|---|
| 2256472 | 6/1974 | Fed. Rep. of Germany | 264/45.4 |
| 2481192 | 10/1981 | France | 264/45.4 |
| 55-118838 | 9/1980 | Japan | 264/45.4 |

OTHER PUBLICATIONS

*Whittington's Dictionary of Plastics* by Lloyd R. Whittington, Stamford, Conn., Technomic, ®1968, pp. 59, 60.

Primary Examiner—Philip Anderson
Attorney, Agent, or Firm—McGlew and Tuttle

[57] ABSTRACT

This invention relates to a method of and apparatus for moulding from an expandable plastics material such as expandable polystyrene beads, an elongate article which has a length greater than the length of the mould. The method includes the steps of introducing the unexpanded plastic material into a mould, expanding the material in such a manner that the material at one end of the article is not fully expanded, moving the article along the mould partially through an opening in its end, introducing fresh material into the mould to be in contact with the partially expanded material at one end of the article and fully expanding and bonding the fresh and partially expanded material in the contact zone between the two.

6 Claims, 3 Drawing Figures

METHOD OF MOLDING AN ELONGATE FOAMED RESIN ARTICLE FROM EXPANDABLE THERMOPLASTIC RESIN BEADS

FIELD OF THE INVENTION

This invention relates to a method of and apparatus for continuously moulding elongate articles from a particulate expandable plastics material such as polystyrene or the like.

BACKGROUND TO THE INVENTION

An article which is moulded from expandable polystyrene beads cannot be welded to another by means of steam as the steam will cause the fully expanded and welded beads, and the portions of the articles exposed to the steam, to collapse to about two thirds of their fully expanded volume.

OBJECT OF THE INVENTION

It is the object of this invention to provide a method of and apparatus for welding particulate expandable plastics material which will overcome the above noted problem.

SUMMARY OF THE INVENTION

A method of moulding an elongate article from particulate expandable plastics material according to the invention includes the steps of introducing the particulate expandable plastics material into a mould, expanding the material in the mould in such a manner that the material at one end of the article is not fully expanded, introducing fresh particulate expandable plastics material into the mould to be in contact with the partially expanded material at the one end of the article and fully expanding the fresh and partially expanded material in the contact zone.

The particulate expandable plastics material may be expandable polystyrene in bead form.

Apparatus for moulding elongate articles from a particulate expandable plastics material according to the invention includes a mould, means for introducing the expandable particulate plastic material in an unexpanded state into the mould and means for expanding the material in the mould with the material expanding means being adapted to only partially expand the material at one end of the mould.

In one form of the invention the mould is open ended and the apparatus includes means for moving the article being moulded through the mould as it is being progressively moulded.

BRIEF DESCRIPTION OF THE DRAWINGS

An embodiment of the invention is now described by way of example with reference to the drawings in which.

DETAILED DESCRIPTION OF THE INVENTION

Figure 1:
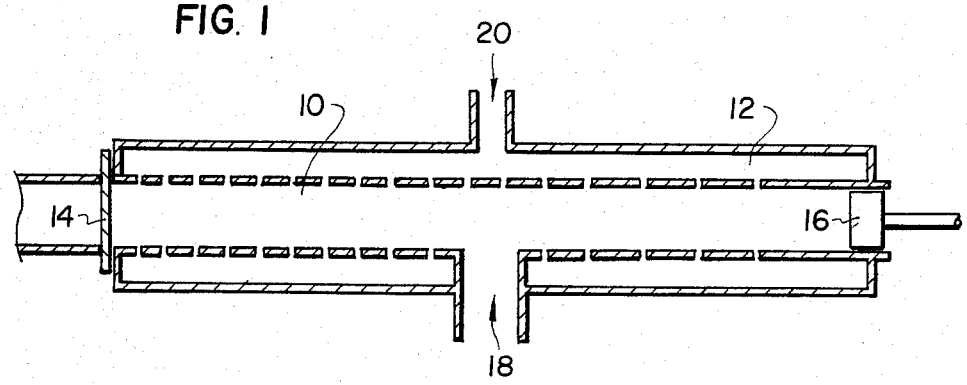
FIGS. 1, 2 and 3 are schematic side elevational views of the moulding apparatus of the invention in three consecutive steps of the inventive method.

The apparatus of the invention is shown in the drawings to consist of an elongate open ended mould 10, a steam jacket 12 which surrounds the mould, a slide gate 14 and a pusher 16.

The mould 10 has a cavity shape which is of constant cross-section over the length of the mould in a direction normal to the axis of the mould. Within the steam jacket 12 the mould is perforated by conventional steam ports which are evenly spaced over its length with the important exception of the ports at the right hand end of the jacketed mould are spaced further apart than the remaining ports or may be omitted altogether. The mould includes an inlet port 18 through which expandable or other thermoplastic beads are fed into the mould.

Figure 2:
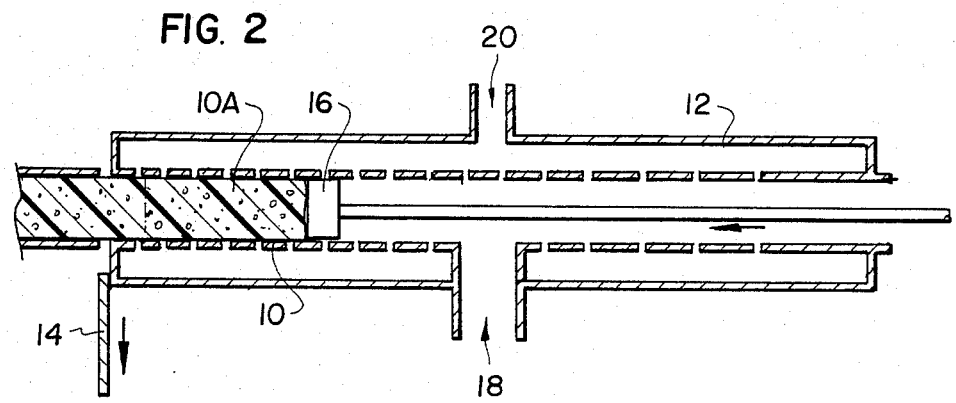
Figure 3:
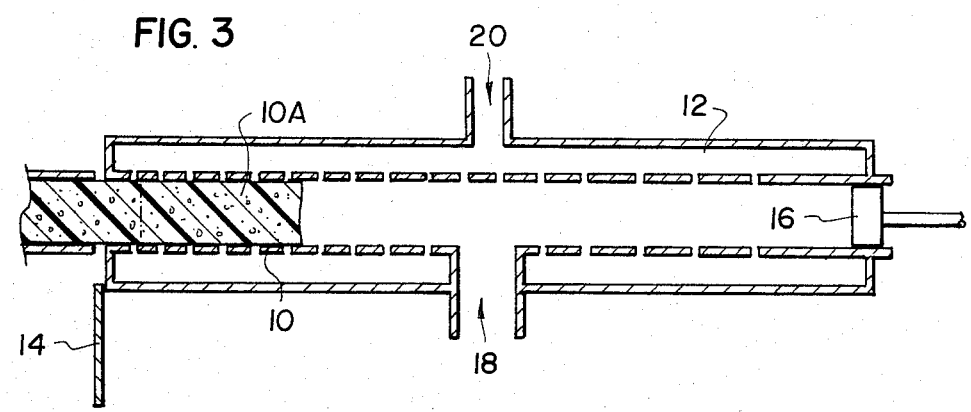

In use, the left hand side of the mould is closed by the slide gate 14 as shown in FIG. 1. Expandable polystyrene moulding beads are fed into the now closed mould through the port 18 and steam is introduced into the jacket 12 through a port 20 through which air, displaced from the mould by the beads, is initially expelled. The beads in the mould are expanded in the mould and are welded by the steam in the conventional manner. However, the shortage of ports on the right hand side of the mould starves the beads at this end of the mould of steam and so retards their expansion and welding relatively to those in the remaining portion of the mould. After a short forming time i.e. after expanding and coalescing the gate 14 is removed from the mould and the pusher 16 is activated to move the incomplete article 10A to the left in the mould until the incomplete end 10A of the article is well clear of the inlet port 18, i.e. to the left as shown in FIG. 2. The pusher is then retracted to the position illustrated in FIG. 3. The mould is again charged with expandable beads which are steamed as described above again leaving the beads at the right hand end of the mould partially welded to each other, while the material in the left hand portion of the mould is fully expanded and coalesced as hereinbefore described.

The partially or not fully expanded and welded beads at the right hand end of the previously moulded portion of the article (the contact zone) are, with the second steam application, fully expanded and bond with the fresh beads in the mould during the second steaming operation. In the meantime, the leading portion of the article is cooled and set or formed in the mould to left of the gate 14. The process is repeated until the article being moulded has reached the required length.

In an example of the invention, the cavity of the mould 10 is substantially U-shaped in cross-section with a cross-sectional area of approximately 4,364 mm$^2$. The spacing between the mould ports is 25 mm with about 350 mm of the right hand end of the mould having no ports at all. The expandable polystyrene beads used in the process are block or conventional moulding beads which have a density of between 12 and 80 grams per liter.

The expandable beads in the mould are steamed at a pressure of about 0.5 bar at 110° C. for approximately ten seconds during each moulding operation of the process. The partially moulded article is allowed to cure for about twenty five seconds before being moved by the pusher 16 to the left in FIG. 2 and the commencement of the second moulding operation.

I claim:

1. A method of molding an elongate article from expandable thermoplastic resin beads, comprising the steps of:
    (a) introducing the expandable thermoplastic resin beads into a mold defining a mold cavity having first end and an opposite second end;
    (b) introducing steam into the mold cavity to expand and bond said beads in the mold cavity;

(c) starving the beads of steam in an end zone at the first end of the mold cavity so that said beads in said end zone are not fully expanded and not fully bonded to each other;

(d) allowing the beads in the mold cavity to partly expand and coalesce to form a partly formed article in the mold cavity;

(e) moving the partially formed article in a direction of the second end of the mold cavity with an end face of the article which carries the partially expanded beads forming a wall in the mold cavity at a contact zone of the mold cavity intermediate the first and second ends of the mold cavity;

(f) introducing fresh expandable thermoplastic resin beads into the mold cavity and into contact with the partially expanded beads in the contact zone of the mold cavity;

(g) again introducing steam into the mold cavity to fully expand and fully bond the partially expanded beads and the fresh beads in the contact zone as well as remaining fresh beads in the mold cavity with the exception of fresh beads in the end zone of the mold cavity adjacent the first end of the mold cavity which are starved of steam so that the fresh beads in the end zone of the mold cavity are only partially expanded and partially bonded; and (h) repeating steps (a) to (g) until the article has reached a desired length.

2. A method according to claim 1, including utilizing expandable polystyrene beads as the thermoplastic resin beads and fresh expandable thermoplastic resin beads.

3. An apparatus for molding elongated articles from expandable thermoplastic resin beads, comprising:
an elongate mold wall defining a mold cavity;
a steam jacket surrounding the mold wall over a length of mold wall;
the mold wall having a plurality of steam ports therethrough communicating the steam ports being evenly spaced in the mold wall over one end and an intermediate portion of a length of the jacket with the steam port being spaced by a greater amount at an end zone at an opposite end of the length of the jacket so that steam supplied to the jacket will enter the mold cavity to a lesser extend adjacent the end zone than in remaining areas of the mold cavity;
means for introducing expandable particulate plastic beads into the mold cavity; and
means for introducing steam into the steam jacket.

4. An apparatus according to claim 3, wherein the mold wall has no steam ports adjacent the end zone.

5. An apparatus according to claim 4, wherein the end zone is about 350 mm in length, the steam ports being spaced apart by about 25 mm in said mold walls spaced away from said end zone.

6. An apparatus according to claim 3, wherein said mold wall defines said mold cavity to be open at both ends thereof, a movable slide wall at one end of said mold wall for closing one end of said cavity and a pusher engaged in an opposite end of said mold wall from said slide for closing an opposite end of said mold cavity.

* * * * *